US012672702B1

(12) United States Patent
Shet et al.

(10) Patent No.: US 12,672,702 B1
(45) Date of Patent: Jul. 7, 2026

(54) PROTECTIVE CASING FOR RINGS

(71) Applicant: ULTRAHUMAN HEALTHCARE PVT LTD, Bangalore South (IN)

(72) Inventors: Adhit Shet, Abu Dhabi (AE); Ritwik Raj, Abu Dhabi (AE); Vatsal Singhal, Abu Dhabi (AE); Mohit Kumar, Abu Dhabi (AE)

(73) Assignee: ULTRAHUMAN HEALTHCARE PVT LTD, Bangalore South (IN)

( * ) Notice: Subject to any disclaimer, the term of this patent is extended or adjusted under 35 U.S.C. 154(b) by 0 days.

(21) Appl. No.: 19/054,172

(22) Filed: Feb. 14, 2025

(51) Int. Cl.
| | |
|---|---|
| *A44C 9/00* | (2006.01) |
| *G06K 19/077* | (2006.01) |
| *G06Q 20/32* | (2012.01) |
| *G06Q 20/38* | (2012.01) |

(52) U.S. Cl.
CPC .......... *A44C 9/0092* (2013.01); *A44C 9/0053* (2013.01); *G06K 19/07762* (2013.01); *G06K 19/07788* (2013.01); *G06Q 20/3278* (2013.01); *G06Q 20/389* (2013.01)

(58) Field of Classification Search
CPC ..... A44C 9/0053; A44C 15/00; A44C 15/004; A44C 19/00; A44C 27/00; A44C 27/005; A44C 5/0015; A44C 17/02; A44C 17/00; A44C 17/005; A44C 17/0208; A44C 17/0216; A44C 25/002

USPC .......................................................... 455/41.1
See application file for complete search history.

(56) References Cited

U.S. PATENT DOCUMENTS

| | | | | |
|---|---|---|---|---|
| 2008/0148776 A1* | 6/2008 | Alley | ................... | A44C 9/0092 |
| | | | | 63/15.8 |
| 2021/0315333 A1* | 10/2021 | Wong | ........................ | A44C 9/02 |
| 2023/0204711 A1* | 6/2023 | Meadow | ................... | G01S 5/10 |
| | | | | 235/384 |
| 2023/0401556 A1* | 12/2023 | Rezayee | ............ | G06K 19/0709 |

* cited by examiner

*Primary Examiner* — Ajibola A Akinyemi
(74) *Attorney, Agent, or Firm* — Renner, Otto, Boisselle & Sklar, LLP

(57) ABSTRACT

A protective casing for a ring for making contactless payment is disclosed. The protective casing comprises a body constructed from stretchable silicone material that ensures robust protection against physical damage such as scratches, dents, and environmental wear. The protective casing further includes an NFC chip integrated with the body. The NFC chip is configured to securely store and transmit tokenized payment credentials. The protective casing further includes a conductive antenna, strategically arranged to optimize signal transmission with an external NFC-enabled payment terminal. The protective casing is universally compatible, customizable in design, and ergonomically crafted for ease of use.

20 Claims, 4 Drawing Sheets

Fig. 3a                                    Fig. 3b

PROTECTIVE CASING FOR RINGS

FIELD OF INVENTION

The present invention generally relates to the field of wearable technology. More specifically, the present invention is related to a protective casing for rings, for making contactless payment.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Wearable technology has experienced significant advancements, with smart rings emerging as a popular choice due to their compact form factor and multifunctionality. These smart rings typically incorporate features such as health monitoring, activity tracking, and seamless connectivity with other smart devices. However, the smart rings are inherently vulnerable to physical damage, including scratches, dents, and general wear and tear, resulting from regular usage. Current solutions for safeguarding these devices are inadequate, as they often fail to provide effective protection without impairing the functionality of the smart ring.

Concurrently, the demand for wearable devices that facilitate contactless payment has increased substantially. Conventional smart rings do not offer advanced features like contactless payments and security associated with the payments. Lack of such features limit usage of the smart rings.

Therefore, a solution for above mentioned limitations is required.

OBJECTS OF THE INVENTION

An object of the present invention is to provide a protective casing for rings that effectively safeguards the rings from physical damage such as scratches, dents, and wear-and-tear during regular usage.

Another object of the present invention is to incorporate a contactless payment functionality within the protective casing by integrating a Near Field Communication (NFC) chip and a conductive antenna to enable secure and efficient tokenized payment transactions.

Yet another object of the present invention is to provide a universally adaptable, modular design that integrates seamlessly with various kind of rings, ensuring full compatibility and preserving the original functionality and performance of the rings.

Yet another object of the present invention is to implement a secure payment system within the protective casing that utilizes advanced tokenization and encryption protocols, ensuring user data confidentiality and secure NFC-based transactions.

Yet another object of the present invention is to provide a multi-functional protective casing that combines physical protection with advanced payment capabilities, enhancing the utility of the rings in a cost-effective, practical, and user-friendly manner.

SUMMARY OF THE INVENTION

This summary is provided to introduce aspects related to the present invention of protective casing for rings and the aspects are further described below in the detailed description. This summary is not intended to identify essential features of the claimed subject matter nor is it intended for use in determining or limiting the scope of the claimed subject matter.

In an embodiment of the present disclosure, a protective casing for ring is disclosed. The protective casing comprises a body constructed from a stretchable material to wrap around the ring. The protective casing further comprises an NFC (Near field Communication) chip integrated with the body, configured to store tokenized payment credentials and a conductive antenna connected with the NFC chip and integrated with the body. The conductive antenna is configured to facilitate communication between the NFC chip and an external NFC enabled payment terminal for making payments.

In an aspect of the present disclosure, the body of the protective casing is made of using silicone, polyurethane (PU) and rubber.

In another aspect of the present disclosure, the material of the body is transparent or semi-transparent.

In another aspect of the present disclosure, the body of the protective casing is coloured.

In another aspect of the present disclosure, the NFC chip and the conductive antenna are integrated on an inner surface of the body.

In another aspect of the present disclosure, the NFC chip and the conductive antenna are positioned within the body.

In another aspect of the present disclosure, the NFC chip is a passive NFC chip.

In another aspect of the present disclosure, the conductive antenna is made using copper, aluminium, silver, or graphene.

In another aspect of the present disclosure, the conductive antenna is arranged in a circular or spiral configuration on an inner surface of the body.

In another aspect of the present disclosure, the ring is of circular, hexagonal, or octagonal shape.

In another embodiment of the present disclosure, a system for making contactless payment is disclosed. The system comprises a protective casing wrapped around a ring. The protective casing comprises a body constructed from a stretchable material to wrap around the ring. The protective casing further comprises an NFC (Near field Communication) chip integrated with the body, configured to store tokenized payment credentials and a conductive antenna connected with the NFC chip and integrated with the body. The conductive antenna is configured to facilitate communication between the NFC chip and an external NFC enabled payment terminal for making payments. Further the system comprises a user device operable to communicate with the protective casing for storing the tokenized payment credentials in the NFC chip.

In another aspect of the present disclosure, the NFC chip is a passive NFC chip.

In another aspect of the present disclosure, the user device runs a software application accessible by a user for storing the payment credentials.

In another aspect of the present disclosure, the software application requires user authentication for allowing storing, updating, and replacement of the payment credentials.

In another aspect of the present disclosure, transactions of the payments are encrypted using one of Secure Hash Algorithm (SHA), Secure stock Layer (SSL) and Transport Layer Security (TLS).

In another embodiment of the present disclosure, a method for facilitating contactless payments is disclosed. The method comprises receiving one or more payment credentials from a user, tokenizing the payment credentials and transmitting, tokenized payment credentials to an NFC chip for making a payment via an NFC module. The NFC chip is integrated with a body of a protective casing for a ring.

In another aspect of the present disclosure, the software application encrypts the payment credentials before tokenizing.

In another aspect of the present disclosure, the method further comprises receiving a notification indicating a status of the payment by the user device.

In another aspect of the present disclosure, the software application is configured to display payment transaction history of the user, including date, time, amount, and merchant name.

In another aspect of the present disclosure, the software application requires user authentication for allowing storing, updating, and replacement of the payment credentials.

BRIEF DESCRIPTION OF THE DRAWINGS

The accompanying drawings constitute a part of the description and are used to provide further understanding of the present invention. The drawings illustrate exemplary embodiments of the present invention and, together with the description, serve to explain the principles of the present invention.

Figure 1:
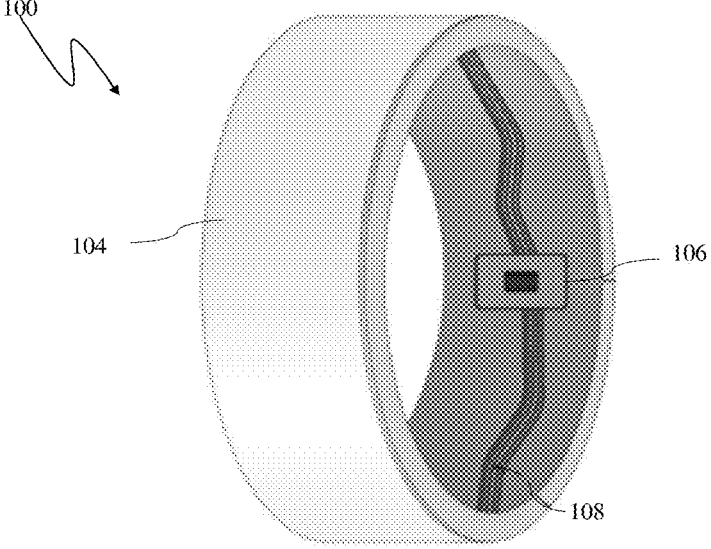
FIG. 1 illustrates a top perspective view of a protective casing for a ring, in accordance with an embodiment of the present invention.

A more complete understanding of the present invention and its embodiments thereof may be acquired by referring to the following description and the accompanying drawings.

DETAILED DESCRIPTION OF THE INVENTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals used herein illustrate only typical embodiments of the present subject matter, and are therefore, not to be considered for limiting its scope, for the subject matter may admit to other equally effective embodiments.

The specification may refer to "an", "another", "one" or "some" embodiment(s) in several locations.

This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skills in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The detailed description includes specific details for the purpose of providing a thorough understanding of the present invention. However, it will be apparent to those skilled in the art that the present invention may be practiced without these specific details.

The present invention relates to a protective casing for rings for making contactless payments. The protective casing is designed to enhance both physical protection and operational utility by integrating advanced payment capabilities. The protective casing comprise a body constructed from durable, stretchable silicone material that ensures robust protection against physical damage such as scratches, dents, and environmental wear. The protective casing further include a passive NFC chip integrated with the body, configured to securely store and transmit tokenized payment credentials. The protective casing further includes a conductive antenna, arranged in a circular or spiral configuration on an inner surface of the casing to facilitate efficient communication between the NFC chip and external NFC-enabled payment terminals. The protective casing is customizable in terms of design, offering options such as transparency or various colors to suit user preferences.

FIG. 1 illustrates a layout diagram of a protective casing 100 wrapped around a ring 102, in accordance with an embodiment of the present invention. The ring 102 may comprises a protective casing 100 which is wrapped around whole body of the ring 102. The protective casing 100 may comprises a body 104 constructed from high-grade stretchable material like silicone, polyurethane or rubber. In one implementation, the protective casing 100 may comprise a body 104 constructed from a high-grade stretchable silicone material that is configured to envelop the ring 102 entirely. The silicone material is selected for its flexibility, durability, and resistance to physical damage, including scratches, impacts, and environmental factors such as moisture and dust. The elastic properties of the silicone material enable a snug and secure fit around the ring 102 and facilitates easy attachment and removal without causing damage to the ring 102 or the protective casing 100. Additionally, the protective casing 100 is customizable to be transparent, semi-transparent, and also available in various colors based on user preferences.

The protective casing 100 may further comprise an NFC chip 106 integrated within the body 104 of the protective casing 100. The NFC chip 106 is configured to operate in a passive mode means the NFC chip 106 harness power from electromagnetic field generated by an external NFC-enabled payment terminal 406 (illustrated in FIG. 4). This feature eliminates the need for an internal power source making the ring 102 lightweight and efficient. The NFC chip 106 is further configured to securely store tokenized payment credentials of users, which are encrypted for enhanced security. During a transaction, the stored credentials of the users are transmitted to the external NFC-enabled payment terminal 406, enabling a seamless and secure contactless payment process.

The protective casing 100 may further comprise a conductive antenna 108 integrated with the body 104 of the protective casing 100. The conductive antenna 108 may be constructed from copper, aluminium, silver, or graphene. In one implementation, the conductive antenna 108 is made of copper, due to its superior electrical conductivity and durability. The conductive antenna 108 is connected with the NFC chip 106 and integrated with the body 104 of the protective casing 100 and is arranged in a circular or spiral configuration along the inner surface. This specific design enhances efficiency the conductive antenna 108 by maximizing the surface area for signal transmission and ensuring consistent electromagnetic communication with the NFC-enabled payment terminal 406. The conductive antenna 108 serves as a critical link between the NFC chip 106 and NFC-enabled payment terminal 406. The placement of the conductive antenna 108 within the protective casing 100 ensures protection against physical wear and tear, thereby enhancing its operational lifespan. The design of the conductive antenna 108 allows for efficient signal transmission without obstructing the ergonomic features of the ring 102, ensuring the ring 102 remains comfortable for extended use.

In one implementation, the NFC chip 106 and the conductive antenna 108 are strategically integrated along the inner surface of the protective casing 100. This configuration allows for ease of replacement or upgrade of these components without requiring the entire protective casing 100 to be discarded. The placement ensures direct and efficient electromagnetic coupling with the ring 102, optimizing communication with the NFC-enabled payment terminal 406. The inner-surface integration also allows for simplified maintenance and the flexibility to incorporate advanced chip or antenna designs in future iterations. Additionally, this arrangement facilitates quick replacement of worn or outdated components, contributing to the sustainability and adaptability of the protective casing 100 while maintaining its ergonomic and protective functionalities.

In another implementation, the NFC chip 106 and the conductive antenna 108 are securely positioned within the protective casing 100. This arrangement ensures that these components are entirely encapsulated within the body 104 of the casing, providing superior protection against environmental factors, such as moisture, dust, and mechanical damage. The central positioning enhances the durability of the protective casing 100 by minimizing exposure to external elements, thereby prolonging the operational lifespan of the chip and antenna. The encapsulation also enables seamless integration into the overall design of the casing, ensuring that the ergonomic properties of the ring 102 are preserved.

Figure 2:
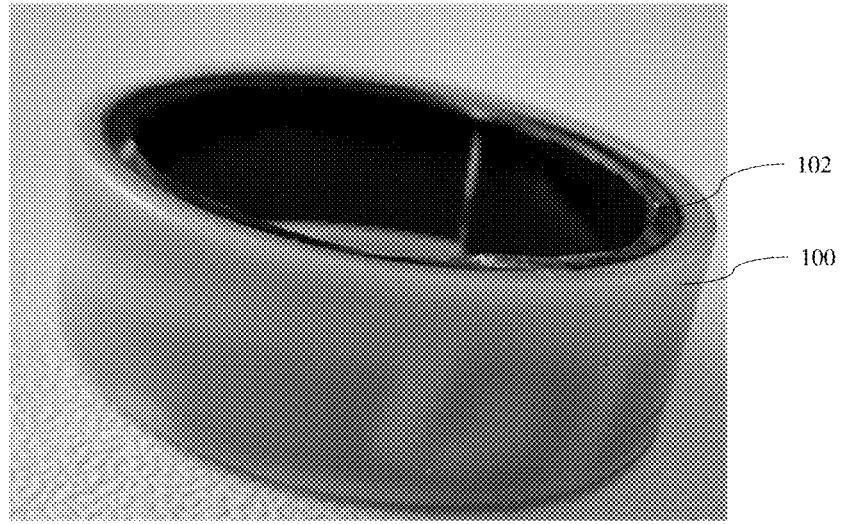
FIG. 2 illustrates a perspective view of the protective casing wrapped around the ring, in accordance with an embodiment of the present invention.

FIG. 2 illustrates a perspective view of the protective casing 100 wrapped around the ring 102, in accordance with an embodiment of the present invention. The protective casing 100 is constructed from high-grade stretchable silicone material. The silicone made protective casing 100 is designed to snugly envelop the ring 102 and provides a durable shield against physical damage such as scratches, dents, wear from regular use and ensures long-term safety of the ring 102. Further the protective casing 100 is integrated with the NFC chip 106 strategically placed to facilitate seamless communication with NFC-enabled payment terminal 406. Further, the conductive antenna 108 is encircled around the inner surface of the protective casing 100 which enhances signal strength and ensures reliable data transmission during contactless payment transactions.

Additionally, the flexibility of the protective casing 100 supports universal compatibility with various types of rings, and various shapes of ring like circular, hexagonal or octagonal, making it adaptable to multiple form factors. The protective casing 100 also includes customization options that allows the casing to be manufactured in transparent, semi-transparent, or colorful finishes based on diverse user preferences. The ergonomic design of the protective casing 100 allows easy attachment and detachment from the ring 102 without damaging or obstructing original functionalities of the ring 102 such as health tracking or activity monitoring. The silicone protective casing provides both robust physical protection and advanced payment capabilities in a compact, user-friendly design.

Figure 3:
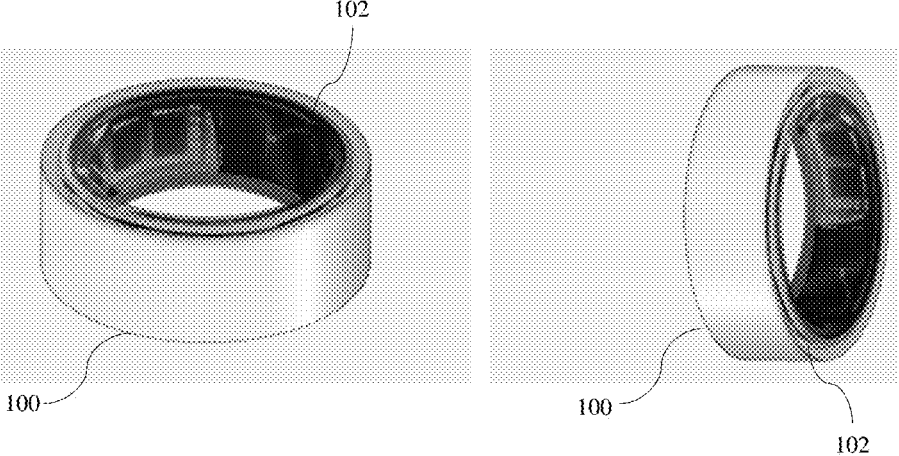
FIGS. 3*a* and 3*b* illustrate top view and perspective view of the ring wrapped with protective casing respectively, in accordance with an embodiment of the present invention.

FIGS. 3a and 3b illustrate top view and perspective view of the ring 102 wrapped with protective casing 100 respectively, in accordance with an embodiment of the present invention. The top view provides a clear depiction of the ring 102 wrapped within the protective casing 100, highlighting the circular arrangement of the embedded conductive antenna 108 along outer circumference. This view emphasizes the seamless integration of the protective casing 100 with the ring 102 and also ensures a snug and secure fit. The perspective view offers a three-dimensional representation, showcasing the ergonomic design and structural features of the protective casing 100, including the placement of the NFC chip 106 and the overall form factor.

Figure 4:
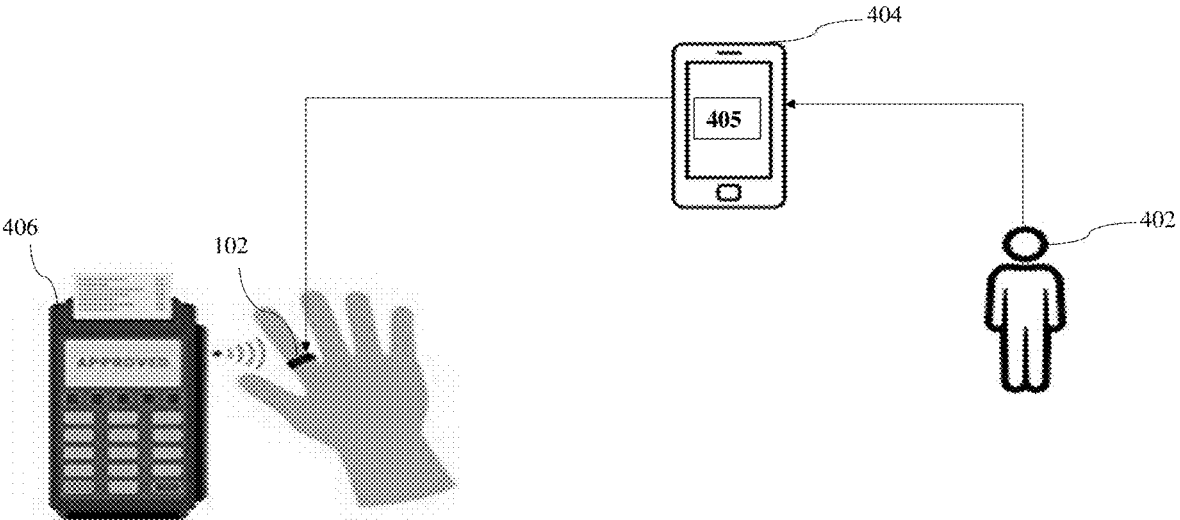
FIG. 4 illustrates a connection diagram of a system for making contactless payment, in accordance with an embodiment of the present invention.

FIG. 4 illustrates a connection diagram of a system for making contactless payment, in accordance with an embodiment of the present invention. The system 400 comprises protective casing 100 wrapped around the ring 102. The protective casing 100 may comprise a body 104 constructed from high-grade stretchable material like silicone, polyurethane or rubber. In one implementation, the protective casing 100 may comprise a body 104 constructed from a high-grade stretchable silicone material that is configured to envelop the ring 102 entirely. The silicone material is selected for its flexibility, durability, and resistance to physical damage, including scratches, impacts, and environmental factors such as moisture and dust. The elastic properties of the silicone material enable a snug and secure fit around the ring 102 and facilitates easy attachment and removal without causing damage to the ring 102 or the protective casing 100. Additionally, the protective casing 100 is customizable to be transparent, semi-transparent, and also available in various colors based on user preferences.

The protective casing 100 may further comprise an NFC chip 106 integrated within the body 104 of the protective casing 100. The NFC chip 106 is configured to operate in a passive mode means the NFC chip 106 harness power from electromagnetic field generated by an external NFC-enabled payment terminal 406. This feature eliminates the need for an internal power source making the ring 102 lightweight and efficient. The NFC chip 106 is further configured to securely store tokenized payment credentials of the users 402, which are encrypted for enhanced security. During a transaction, the stored credentials of the users 402 are transmitted to the external NFC-enabled payment terminal 406, enabling a seamless and secure contactless payment process.

The protective casing 100 may further comprise a conductive antenna 108 integrated with the body 104 of the protective casing 100. The conductive antenna is 108 constructed from copper, aluminium, silver, or graphene. In one implementation the conductive antenna 108 is made of copper, due to its superior electrical conductivity and durability. The conductive antenna 108 is connected with the NFC chip 106 and integrated with the body 104 of the protective casing 100 and is arranged in a circular or spiral configuration along the inner circumference. This specific design enhances efficiency the conductive antenna 108 by maximizing the surface area for signal transmission and ensuring consistent electromagnetic communication with the NFC-enabled payment terminal 406. The conductive antenna 108 serves as a critical link between the NFC chip 106 and NFC-enabled payment terminal 406. The placement of the conductive antenna 108 within the protective casing 100 ensures protection against physical wear and tear, thereby enhancing its operational lifespan. The design of the conductive antenna 108 allows for efficient signal transmission without obstructing the ergonomic features of the ring 102, ensuring the ring 102 remains comfortable for extended use.

In one implementation, the NFC chip 106 and the conductive antenna 108 are strategically integrated along the inner surface of the protective casing 100. This configuration allows for ease of replacement or upgrade of these components without requiring the entire protective casing 100 to be discarded. The placement ensures direct and efficient electromagnetic coupling with the ring 102, optimizing communication with the NFC-enabled payment terminal 406. The inner-surface integration also allows for simplified maintenance and the flexibility to incorporate advanced chip or antenna designs in future iterations. Additionally, this arrangement facilitates quick replacement of worn or outdated components, contributing to the sustainability and adaptability of the protective casing 100 while maintaining its ergonomic and protective functionalities.

In another implementation, the NFC chip 106 and the conductive antenna 108 are securely positioned within the protective casing 100. This arrangement ensures that these components are entirely encapsulated within the body 104 of the casing, providing superior protection against environmental factors, such as moisture, dust, and mechanical damage. The central positioning enhances the durability of the protective casing 100 by minimizing exposure to external elements, thereby prolonging the operational lifespan of the chip and antenna. The encapsulation also enables seamless integration into the overall design of the casing, ensuring that the ergonomic properties of the ring 102 are preserved.

Further the system may comprise a user device 404. The user device 404 may include but is not limited to, smartphone, tablet, PC, display screen. The user device 404 acts as an intermediary for configuring the ring 102 with payment credentials. The user device 404 is equipped with an NFC module 405 that establishes a secure short-range communication link with the NFC chip 106 integrated with the body 104 of the protective casing 100. The NFC module 405 within the user device 404 establishes a short-range wireless connection with the NFC chip 106 integrated with the body 104 of the protective casing 100. The user device 404 further includes a software application. The user device 404 receives one or more payment credentials from the user 402 via the software application. Further the software application performs tokenization. The tokenization involves process that converts sensitive payment details of the user 402 into unique, encrypted tokens. These tokens are transaction-specific, ensuring that they cannot be reused or decrypted even if intercepted. After the generation of tokenized credentials, the tokenized credentials are transmitted to the NFC chip 106 integrated with the body 104 of the the protective casing 100 using encrypted NFC communication protocols, ensuring data integrity and preventing unauthorized access. The software application requires user authentication for allowing storing, updating, and replacement of the payment credentials.

The system may further include an NFC-enabled payment terminal 406. When the ring 102 is brought within proximity to the NFC-enabled payment terminal 406 typically within a range of a few centimeters. The NFC-enabled payment terminal 406 initiates the process by generating a low-frequency electromagnetic field. This low-frequency electromagnetic field is emitted through an NFC antenna integrated within the terminal, designed to power NFC devices in its vicinity. The conductive antenna 108 integrated with the protective casing 100 of the ring 102 is configured to capture this electromagnetic field efficiently. The conductive antenna 108 which may be constructed from materials such as copper or similar high-conductivity metals, is strategically designed in a circular or spiral configuration to optimize field capture. This captured energy is then directed to activate the NFC chip 106 integrated into the protective casing 100.

Upon activation, the NFC chip 106 retrieves the tokenized payment credentials, which have been pre-configured and securely transmitted from the user device 404 during the setup phase. The tokenization process ensures that these credentials are encrypted, unique to the transaction, and devoid of sensitive user data such as the actual card number or personal identification information. This design prevents unauthorized access and minimizes risks associated with data breaches or interception during transmission. The NFC-enabled payment terminal 406 processes the data by communicating with a payment network or acquirer bank associated with the transaction upon receiving these credentials.

The payment network or the acquirer bank verifies the token by decrypting it using a secure key associated with the tokenization process. The decrypted token is matched against stored payment credentials of the user 402 in the secure network environment to confirm its authenticity and validity. If the credentials are validated successfully, the payment network authorizes the transaction and sends an approval message back to the NFC-enabled payment terminal 406. The NFC-enabled payment terminal 406 completes the transaction by processing the payment and providing confirmation to the user 402 through a visual or auditory signal, such as a beep, screen notification, or printed receipt. The payment network or the acquirer bank also provide information about the status of the payment to the user 402 via the software application. The software application further configured to display payment transaction history of the user 402, including date, time, amount, and merchant name. The transactions of the payments are encrypted using one of Secure Hash Algorithm (SHA), Secure stock Layer (SSL) and Transport Layer Security (TLS).

The present invention demonstrates significant technical advancement by seamlessly integrating a passive NFC chip and a conductive antenna within a protective casing for rings. The invention enables secure, efficient, and user-friendly contactless payment functionality. The conductive antenna, embedded in the protective casing in a circular or spiral arrangement, optimizes signal transmission between the NFC chip and external NFC-enabled payment terminal. The use of tokenized payment credentials, in conjunction with robust encryption protocols, ensures a high level of transaction security, safeguarding user data. Furthermore, the protective casing constructed from durable and stretchable silicone, provides superior resistance to physical damage, environmental wear, and scratches, while maintaining the ring's core functionalities. This invention also incorporates user-centric features, including ergonomic design, universal compatibility, and customization options, thereby delivering a comprehensive solution that merges advanced technology with practicality, representing a significant enhancement over existing wearable and payment systems.

Although implementations of protective casing for rings, for making contactless payment have been described in language specific to structural features and/or methods, it is to be understood that the appended claims are not necessarily limited to the specific features or methods described. Rather, the specific features and methods are disclosed as examples of implementations protective casing for rings, for making contactless payment.

The invention has been described above with reference to numerous embodiments and specific examples. Many variations will suggest themselves to those skilled in this art in light of the above detailed description. All such obvious variations are within the full intended scope of the appended claims.

We claim:

1. A protective casing comprising:
a body fabricated using a stretchable material to removably wrap the protective casing around a ring;
an NFC (Near field Communication) chip integrated with the body, wherein the NFC chip is configured to store tokenized payment credentials; and
a conductive antenna connected with the NFC chip and integrated with the body, wherein the conductive antenna is configured to facilitate communication between the NFC chip and an external NFC enabled payment terminal for making payments.

2. The protective casing as claimed in claim 1, wherein the body of the protective casing is made using one of silicone, polyurethane (PU), and rubber.

3. The protective casing as claimed in claim 2, wherein material of the body is transparent or semi-transparent.

4. The protective casing as claimed in claim 1, wherein the body of the protective casing is coloured.

5. The protective casing as claimed in claim 1, wherein the NFC chip and the conductive antenna are integrated on an inner surface of the body.

6. The protective casing as claimed in claim 1, wherein the NFC chip and the conductive antenna are positioned within the body.

7. The protective casing as claimed in claim 1, wherein the NFC chip is a passive NFC chip.

8. The protective casing as claimed in claim 1, wherein the conductive antenna is made using copper, aluminium, silver, or graphene.

9. The protective casing as claimed in claim 1, wherein the conductive antenna is arranged in a circular or spiral configuration on an inner surface of the body.

10. The protective casing as claimed in claim 1, wherein the ring is of circular, hexagonal, or octagonal shape.

11. A system for making contactless payments, the system comprising:
a protective casing wrapped around a ring, wherein the protective casing comprises:
a body fabricated using a stretchable material to removably wrap the protective casing around a ring;
an NFC (Near field Communication) chip integrated with the body, wherein the NFC chip is configured to store tokenized payment credentials;
a conductive antenna connected with the NFC chip and integrated with the body, wherein the conductive antenna is configured to facilitate communication between the NFC chip and an external NFC enabled payment terminal for making payments; and
a user device operable to communicate with the protective casing for storing the tokenized payment credentials in the NFC chip.

12. The system as claimed in claim 11, wherein the NFC chip is a passive NFC chip.

13. The system as claimed in claim 11, wherein the user device runs a software application accessible by a user for storing the payment credentials.

14. The system as claimed in claim 13, wherein the software application requires user authentication for storing, updating, and replacement of the payment credentials.

15. The system as claimed in claim 11, wherein transactions of the payments are encrypted using one of Secure Hash Algorithm (SHA), Secure stock Layer (SSL), and Transport Layer Security (TLS).

16. A method for facilitating contactless payments, the method comprising:
receiving, via a software application, one or more payment credentials from a user;
tokenizing the payment credentials; and
transmitting, via an NFC module, tokenized payment credentials to an NFC chip for making a payment, wherein the NFC chip is integrated with a body of a removable protective casing for a ring.

17. The method as claimed in claim 16, wherein the software application encrypts the payment credentials before tokenizing.

18. The method as claimed in claim 16, further comprising:
receiving, by a user device, a notification indicating a status of the payment.

19. The method as claimed in claim 16, wherein the software application is configured to display payment transaction history of the user, including date, time, amount, and merchant name.

20. The method as claimed in claim 16, wherein the software application requires user authentication for storing, updating, and replacement of the payment credentials.

* * * * *